(12) United States Patent
Weigel (10) Patent No.: US 6,970,854 B2
(45) Date of Patent: Nov. 29, 2005

(54) SYSTEM FOR REMOTE SIGNATURE WRITING

(75) Inventor: Douglas Weigel, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 09/864,242

(22) Filed: May 25, 2001

(65) Prior Publication Data

US 2002/0178125 A1 Nov. 28, 2002

(51) Int. Cl.[7] .............................. H04L 9/00; G06F 17/60
(52) U.S. Cl. ............................ 705/75; 705/76; 705/77; 235/381; 235/382; 235/332; 725/141; 713/186
(58) Field of Search .............................. 705/67, 39, 74, 705/75, 76

(56) References Cited

U.S. PATENT DOCUMENTS

| | | | | |
|---|---|---|---|---|
| 5,613,012 A | * | 3/1997 | Hoffman et al. | 382/115 |
| 5,721,781 A | * | 2/1998 | Deo et al. | 705/67 |
| 6,044,349 A | * | 3/2000 | Tolopka et al. | 705/1 |
| 6,275,991 B1 | * | 8/2001 | Erlin | 725/141 |
| 6,543,052 B1 | * | 4/2003 | Ogasawara | 725/60 |
| 6,571,221 B1 | * | 5/2003 | Stewart et al. | 705/52 |
| 6,775,536 B1 | * | 8/2004 | Geiger et al. | 455/411 |
| 6,826,690 B1 | * | 11/2004 | Hind et al. | 713/186 |
| 6,832,242 B2 | * | 12/2004 | Keskar | 709/204 |
| 2001/0039571 A1 | * | 11/2001 | Atkinson | |

FOREIGN PATENT DOCUMENTS

EP 898216 A2 * 2/1999 ............. G06F 1/00

* cited by examiner

*Primary Examiner*—James P. Trammell
*Assistant Examiner*—Daniel L. Greene (57) ABSTRACT

A portable device may be configured to transmit a digital signature of a user to an Internet terminal for the user to complete a transaction requiring a signature. The portable device may be a remote control, a personal digital assistance ("PDA"), an electronic pen, and the like. The portable device may include an wireless transceiver to provide transmit capability of the digital signature to the Internet terminal. The portable device may also provide receive capability to receive the digital signature of the user from another signature source and a memory to provide storage capability of the digital signature. Alternatively, the portable device may include an encryptor module to generate a digital signature based on a characteristic of the user and/or the portable device. The portable device may yet further include a keypad to provide an interface for the user to complete transactions requiring the digital signature provided by the portable device. Accordingly, by providing a user with a portable digital signature, the user may become mobile and have the capability to complete electronic transactions at any compatible Internet terminal.

9 Claims, 6 Drawing Sheets

SYSTEM FOR REMOTE SIGNATURE WRITING

TECHNICAL FIELD

The invention relates to digital signatures. More particularly, the invention relates to providing a user the capability to provide the user's digital signature through a portable device.

DESCRIPTION OF THE RELATED ART

The Internet is fast becoming an integral part of today's society. For users, the Internet may provide news, information, and/or services. Generally speaking, the Internet, as currently constituted, is a conglomeration of computers networked together with a common protocol. The computers on the network may provide public access to sites created by entities who wish to share information or services to the users of the Internet. Some of the advantages of the Internet are how quickly information is disseminated between users of the Internet and the geographical reach of the Internet. For instance, a user in Portland, Oreg. may substantially instantaneously access a site that is created by a user in Boston, Mass.

Since the geographic reach and speed of the Internet is appealing, the Internet has become the preferred marketplace. The Internet also offers lower start-up costs in forming a business. In order to begin an Internet-based business, an entrepreneur registers a domain name and creates a Web page at that domain name. With the appropriate supporting software of the Web page, the entrepreneur may be "open" for business.

The Internet also provides users with lower transactional costs. For instance with shopping over the Internet, a user utilizes a Web browser to browse and select items offered for sale. The user typically pays for the selected items with a credit card and the merchant conveniently delivers the items to the user. The user is not required to spend time and natural resources driving to and from a physical store, browsing through the store and/or fighting potential crowds in the physical store. Accordingly, the costs associated with a particular transaction may be considerably lower.

With all the advantages of the Internet, there has been a movement to migrate many more types of transactions to the Internet. Transactions such as loan processing, real estate closings, commercial contracts and the like would all benefit from the convenience and speed of the Internet. However, these types of transactions which may be referred to as secure transactions, generally require signatures to be attached to the accompanying documents of the secure transactions. In the digital environment that is the Internet, it is difficult to attach and authenticate signatures to electronic documents.

In response, federal and state legislatures have enacted legislation to promote the use of digital signature in electronic transactions. A digital signature is typically based on an asymmetric cryptography where every user has a unique pair of private and public keys, duly certified by a trusted Certificate Authority. When a user "signs" a transaction, a unique mathematical code is created with the help of the user's private key and the actual content of the transactions. This "signature", which is bound to the transactions, can identify the user's identity by the signature's relationship to the digital certificate.

Currently, there are many types of technology that offer digital signatures. Technologies like biometrics, retinal scans, smart cards, digitizers, etc., offer a version of digital signatures. Typically, theses technologies offer an interface for a user to input a particularly unique characteristic into the interface, such as a fingerprint or a retinal scan. The unique characteristic is digitized and forwarded to an interfacing computer. Software in the computer uses the digitized unique characteristic to create a digital signature.

The above-mentioned digital signature technologies are an effective way to attach a digital signature of a user while the user is physically near the interfacing computer. However, in today's society, it is not uncommon for a user to be traveling on business or pleasure. While mobile, it may be difficult for a user to initiate secure transactions if the user's digital signature is tied to an interfacing computer, especially if the interfacing computer is a desktop-type computer. Moreover, as the Internet terminals become diverse and simpler, such as televisions or telephones, the new Internet terminals may not include digital signature technology in order to maintain a low consumer cost.

SUMMARY OF INVENTION

In accordance with the principles of the present invention, a method for conducting an electronic transaction includes storing a digital signature of a user in a memory of a portable device. The method further includes performing the electronic transaction, and transmitting the digital signature of the user from the portable device to complete the electronic transaction.

One aspect of the present invention is a device for transmitting a digital signature. The device includes a memory, a keypad configured to provide a user interface for a user, a wireless transceiver, and a controller. The controller is configured to transmit a digital signature stored in the memory through the wireless transceiver in response to a first input from the keypad.

Another aspect of the present invention is an apparatus for generating a digital signature. The apparatus includes an encryptor module, a keypad, a wireless transceiver, and a controller. The controller is configured to transmit a digital signature through the wireless transceiver in response to a first input from the keypad where the digital signature is generated by the encryptor module.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. Although the preferred embodiment of the invention may be practiced as a remote control capable of transmitting a digital signature, one of ordinary skill in the art will readily recognize that the same principles are equally applicable to, and can be implemented in any portable system transmitting a digital signature and that any such variation would be within such modifications that do not depart from the true spirit and scope of the present invention.

In accordance with the principles of the present invention, a system for presenting a digital signature of a user provides a user with mobility and protection against fraudulent transactions. In particular, a portable device may be configured to transmit a digital signature of a user to an Internet terminal for the user to complete a transaction requiring a signature. The portable device may be a remote control, a personal digital assistant ("PDA"), an electronic pen, and the like. The portable device may include a wireless transceiver capable of transmitting the digital signature to the Internet terminal. The portable device may also receive the digital signature of the user from another signature source and include a memory to store the digital signature. Alternatively, the portable device may include an encryptor module to generate a digital signature based on a characteristic of the user and/or the portable device. The portable device may yet further include a keypad to provide an interface for the user to complete transactions requiring the digital signature provided by the portable device. Accordingly, by providing a user with a portable digital signature, the user may become mobile and have the capability to complete electronic transactions at any compatible Internet terminal.

Figure 1:
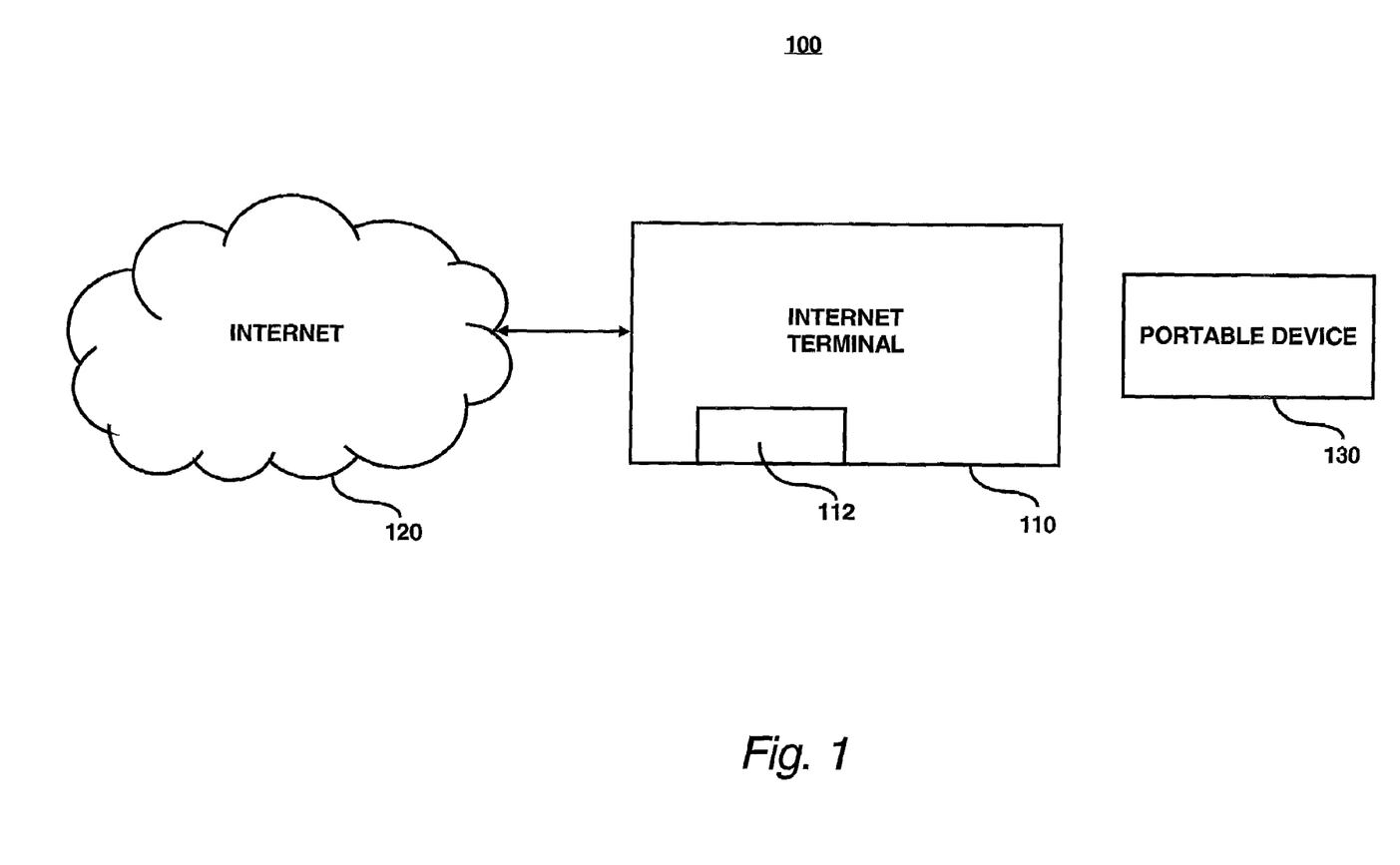
FIG. 1 illustrates a block diagram of an exemplary embodiment according to the principles of the present invention.

FIG. 1 illustrates a block diagram 100 of an exemplary embodiment according to the principles of the present invention. In particular, FIG. 1 shows an Internet terminal 110 interfaced with the Internet 120. The Internet terminal 110 may be configured to provide an interface for a user to browse and/or conduct on-line transactions over the Internet 120. The Internet terminal 110 may include a personal computer, a Web-enabled television, and the like. A portable device 130 may be configured to provide a digital signature for on-line transactions that require a digital signature through a wireless interface, preferably an infrared interface, of the Internet terminal 110. The portable device 130 may be also configured to provide a user mobility to allow interfacing with other Internet terminals that are compatible with the portable device 130.

According to the principles of the present invention, a user may conduct a secure transaction through the Internet terminal 110. A secure transaction may be an on-line transaction requiring a digital signature including contract execution, loan processing, executing court documents, etc. As the transaction progresses, the secure transaction eventually requires the attachment of a digital signature, which will be conveyed to the user through the Internet terminal 110. The user may then utilize the portable device 130 to transmit a digital signature of the user to the Internet terminal 110. The Internet terminal 110 may be configured to attach the digital signature to the secure transaction in response to the Internet terminal 110 receiving the digital signature through a receiver 112. With the portable device 130, a user is not restricted to one Internet terminal, but may conduct secure transactions at any Internet terminal capable of receiving the digital signature from the portable device 130 without fear of fraud.

Figure 2:
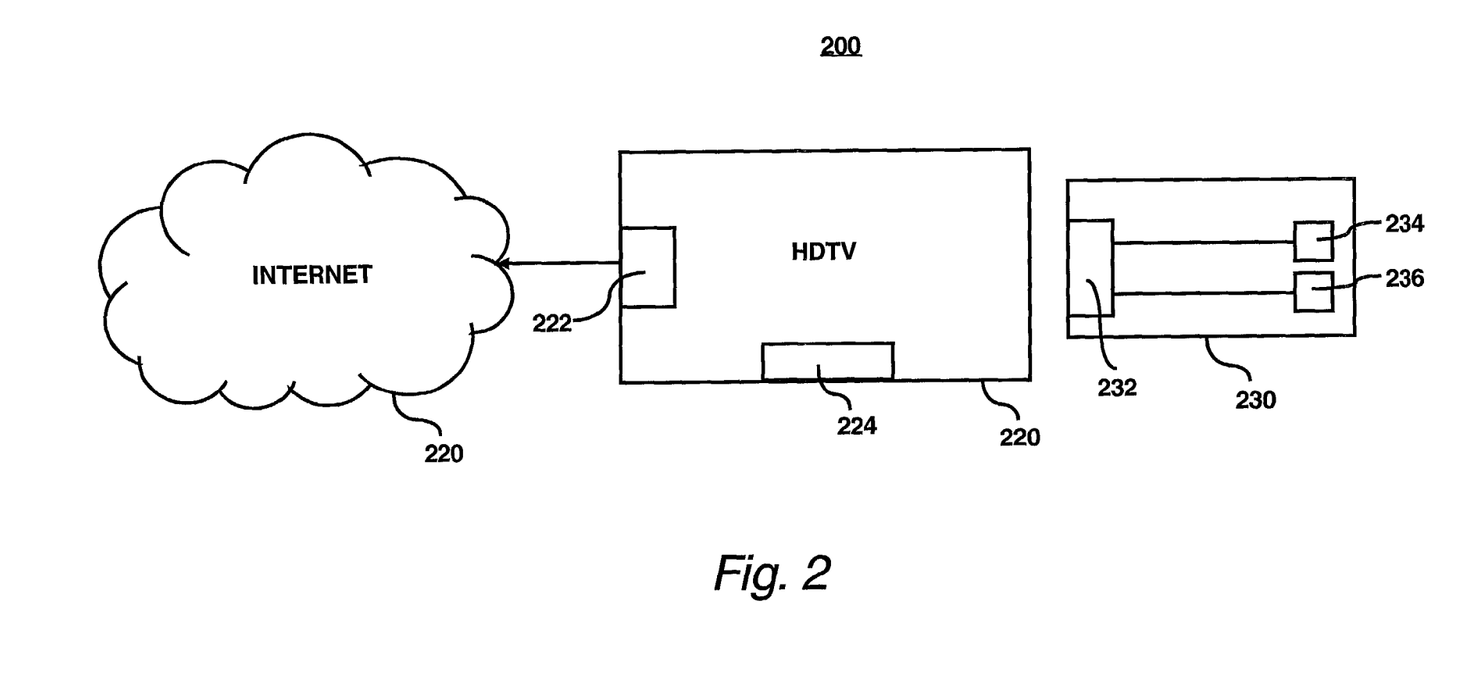
FIG. 2 illustrates a block diagram of an exemplary embodiment of the Internet terminal according to the principles of the present invention.

FIG. 2 illustrates a block diagram of an exemplary embodiment of an Internet terminal as a high definition television ("HDTV") 220 according to the principles of the present invention. As shown in FIG. 2, an Internet terminal may be configured as the HDTV 220 that may interface with the Internet through an Internet interface 222. The Internet interface 222 may be configured to provide a communication path to the Internet for a user to browse, to conduct transactions, to receive information, and/or to transmit information using the Internet terminal 222.

A user may interface with the HDTV 220 via a portable device 230 that may be configured to provide the user with the capability to browse, to conduct transactions, to receive information, and/or to transmit information through the HDTV 220. The portable device 230 may be a remote control of the HDTV 220, a personal digital assistant ("PDA") or any type of portable electronic device that a user may carry. The portable device 230 may include a wireless transceiver 232 to transmit command, data and/or control information to the HDTV 220 through a HDTV wireless transceiver 224. The portable device 230 and the HDTV 220 may communicate using wireless technologies such as infrared, radio frequency and the like. The portable device 230 may be further configured to provide a digital signature of the user to the HDTV 220 from a memory 234 or alternatively from an encryptor module 236 to complete a transaction requiring a digital signature through the HDTV 220.

Figure 3:
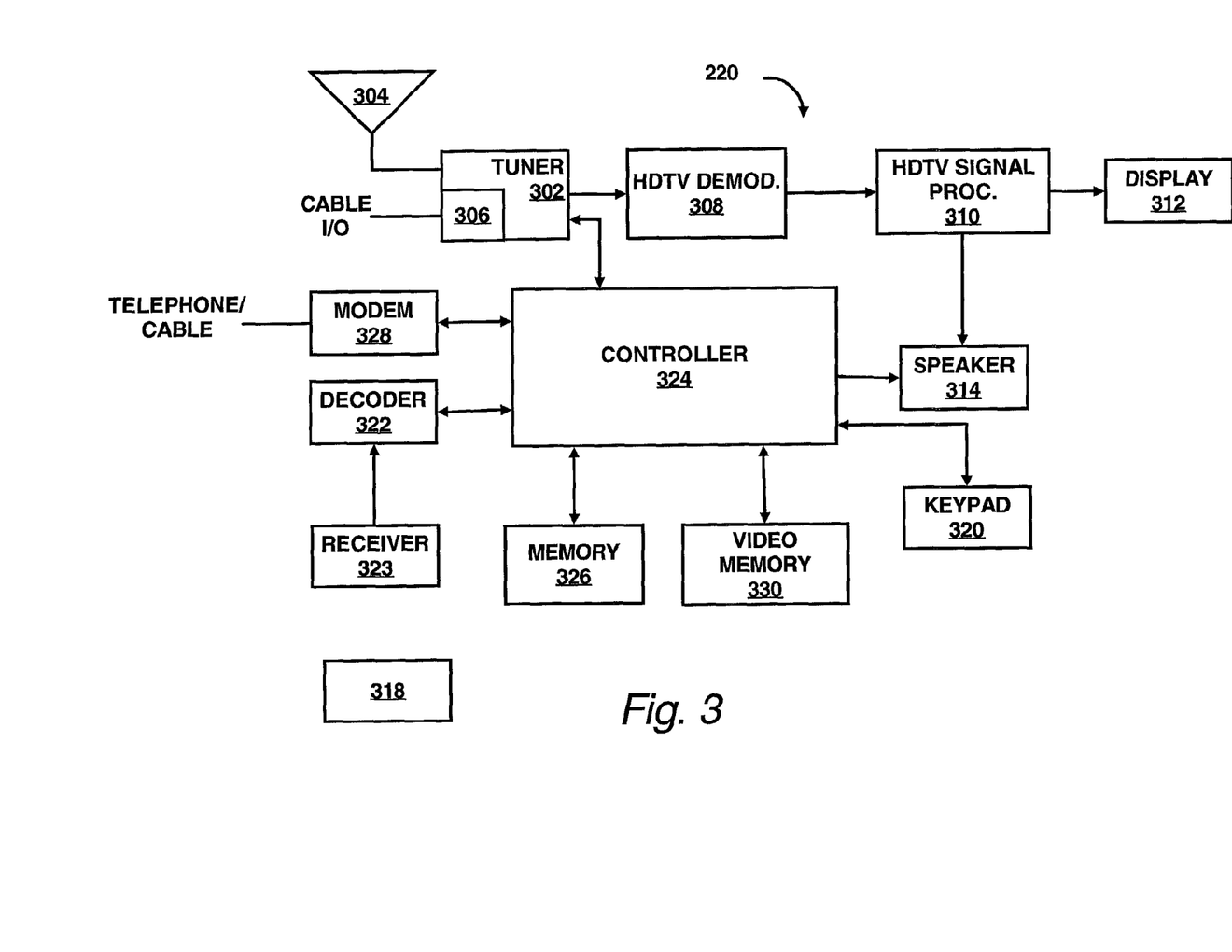
FIG. 3 is a block diagram of an exemplary embodiment of the HDTV according to the principles of the present invention.

FIG. 3 is a block diagram of an exemplary embodiment of the HDTV 220 according to the principles of the present invention. In particular, the HDTV 220 may include a tuner 302 configured to receive HDTV signals either through an antenna 304 or through a cable interface 306. The HDTV signals received at the tuner 302 are forwarded to the HDTV demodulator 308, which is configured to demodulate the carrier signal from the received HDTV signals. AN HDTV signal processor 310 may be configured to correct errors in the demodulated signal and to restore an error-corrected signal to an image signal and an audio signal. The image signal is then displayed to a user by a display 312 and the audio signal is forwarded to the speaker(s) 314 for audio generation.

The HDTV 220 may include a wireless receiver 323 that may be configured to receive information from a remote control 318 or a keypad 320. The information may include commands such as channel selection, volume control, color selection, or other commands associated with controlling a television as known to those skilled in the art. The information may also include a digital signature of a user, which may be retrieved from a memory or generated by an encryptor module in the remote control 318.

The information received at the receiver 316 may be configured to be decoded by a decoder 322. The decoder may be further configured to forward the decoded information from the remote control 318 to a controller 324. The controller 324 may be configured to execute the received commands from either the remote control 318 or the keypad 320. The controller 324 may also be configured to interface with the tuner 302 to adjust the channels, with the display 312 to adjust the settings and with the speaker 314 to adjust the volume. The controller 324 may be a microprocessor, a microcontroller, a digital signal processor or the like.

The controller 324 may also be interfaced with a memory 326, which may be configured to provide storage for a program (not shown) that is executed by the controller 324 to provide the functionality of the HDTV 220. The memory 326 may include a ROM (Read Only Memory) for storing the program of the controller 324, a RAM (Random Access Memory) for temporarily storing data resulting from the program execution of the controller 324, and an EEPROM (Electrically Erasable and Programmable ROM) for storing various reference data.

The controller 324 may be further configured to interface with a video memory 330. The video memory 330 is configured to provide storage area for the controller 324 to assemble video images transferred from the Internet to be displayed on the display 312. The video memory 330 may be implemented with high speed synchronous RAM, asynchronous RAM, etc.

The HDTV 220 may be configured to interface with the Internet either through the cable interface 306 of the tuner 302 or through a modem 328. The modem 328 may be configured to interface with a cable line, a telephone line, an Ethernet line or the like to provide a communication path for the HDTV 220 to the Internet. Information packets from either the cable interface 306 or the modem 328 are reassembled by the controller 324 and forwarded to the display 312 for viewing by a user. Conversely, when information is transmitted to a destination on the Internet, the controller 324 may be further configured to assemble the transmitted information into packets and transmit the assembled packets through one or both of the cable interface 306 and the modem 328.

Figure 4:
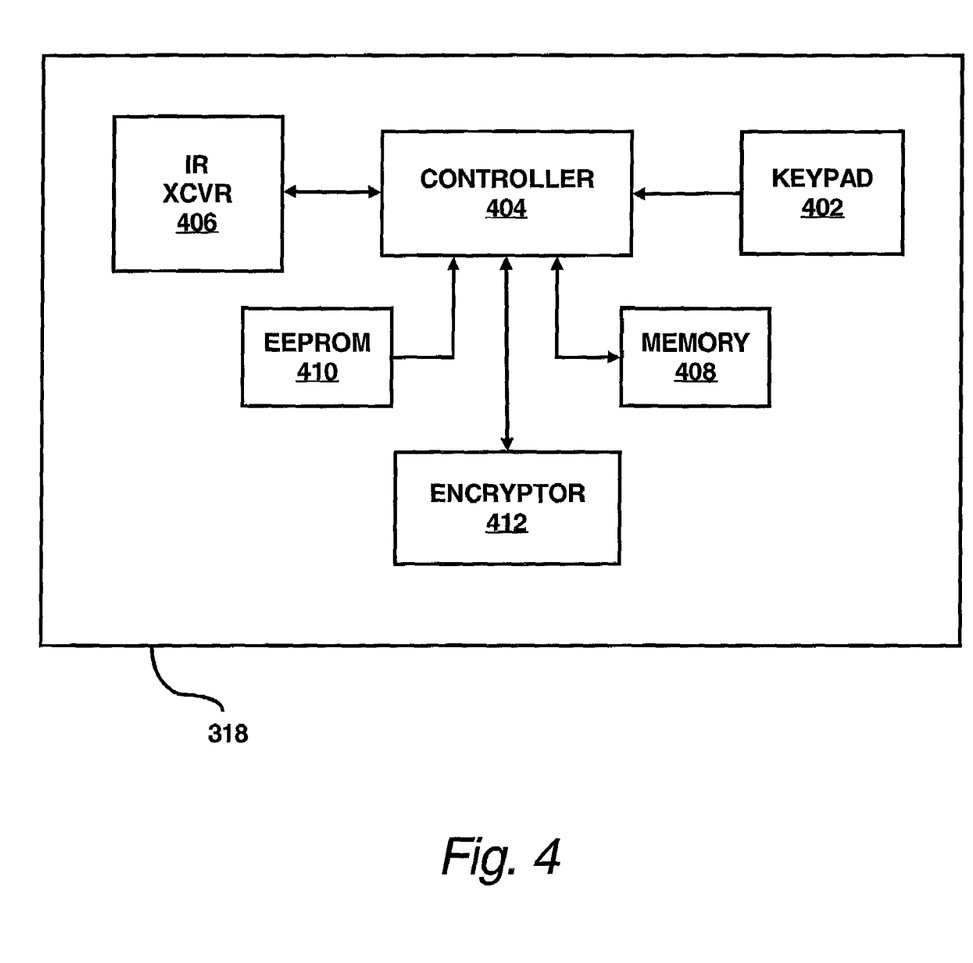
FIG. 4 illustrates one embodiment of the remote control according to the principles of the present invention.

FIG. 4 illustrates one embodiment of a remote control 318 according to the principles of the present invention. In particular, the remote control 318 includes a keypad 402, a controller 404, a wireless transceiver 406, a memory 408, an EEPROM 410 and an optional encryptor module 412. A user may depress keys on the keypad 402 to transmit information to the HDTV 220. The information may include commands to select channels on the HDTV 220, adjust the settings of the display, and, with the speaker 314 of the HDTV 220, to adjust the volume.

The controller 404 may decode the commands from the keypad 402 of the remote control 318. The controller 404 may be further configured to implement the functionality of the remote control. The controller 404 may be a microcontroller, a microprocessor, an application specific integrated circuit ("ASIC") or the like.

After decoding a command inputted by a user of the remote control 318, the controller 404 may be further configured to transmit the inputted command to the HDTV 220 through the wireless transceiver 406. The wireless transceiver 406 may be configured to provide a wireless communication medium to transmit and receive data, command, or the like between other devices equipped with complementary wireless transceivers. The wireless transceiver 406 may utilize radio frequency ("RF"), infrared ("IR"), optical, or the similar protocols to implement the wireless communication medium.

The controller 404 may be further configured to interface with an EEPROM 410. The EEPROM 410 may be configured to provide non-erasable storage of an operating system, program, and/or data to be utilized by the controller 404 for the operation of the remote control 318. Although the current embodiment utilizes an EEPROM for non-erasable memory, other devices such as flash memories, disk storage or the like may be utilized to provide non-erasable storage.

The controller 404 may be further configured to interface with the memory 408. The memory 408 may be configured to provide storage of data, information, etc., which may include a digital signature of a user of the remote control 230. The controller 404 may be further configured to transfer the digital signature of the user from another device to the memory 408.

The controller 404 may be further configured to transmit the stored digital signature from the memory 408 to the HDTV 220 in response to a combination of at least one key-press on the keypad 402. Alternatively, the keypad 402 may include a designated key for transmitting digital key to the HDTV 220. Accordingly, a user may utilize the remote control 318 to transmit a digital signature of the user to the HDTV 220 to complete an on-line transaction requiring the digital signature.

Figure 5:
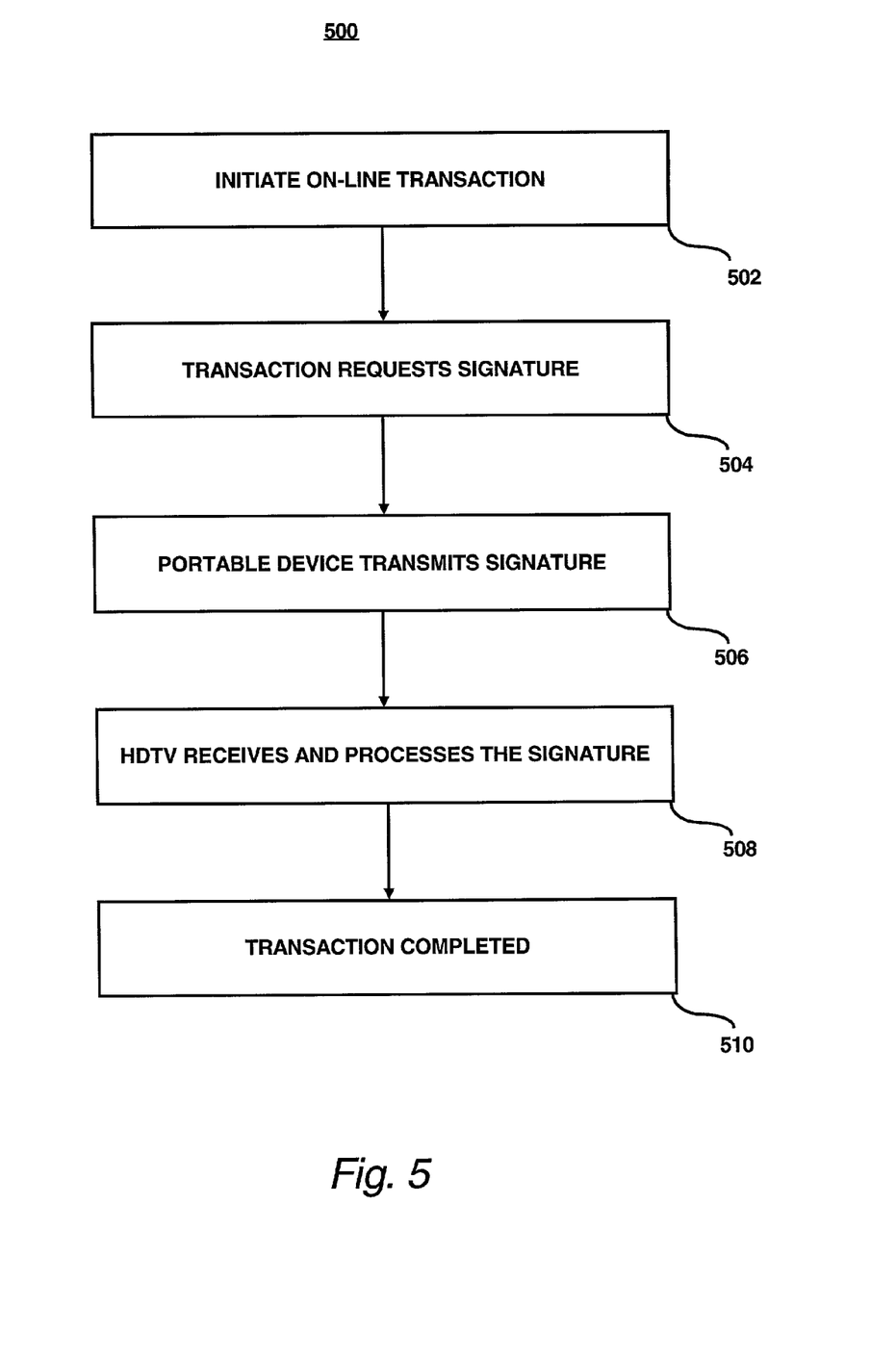
FIG. 5 illustrates an exemplary flow diagram of the transmission of a digital signature in accordance with the principles of the present invention.

FIG. 5 illustrates an exemplary flow diagram of the transmission of a digital signature in accordance with the principles of the present invention. In particular, in step 502, a user may utilize the HDTV 220 as an interface to browse the Internet and initiate this transaction. When the user initiates an on-line transaction at a desired website, the website may be configured to request the input of a digital signature of the user to complete the on-line transaction, in step 504.

The user, in step 506, may initiate a transfer of a stored digital signature of the user from the remote control 130 via a combination of at least one key-press of the keypad 402. Alternatively, the remote control 230 may generate a digital signature by the encryptor module 412 of the remote control to transmit to the HDTV 220. In either case, the digital signature is encoded and transmitted via wireless protocols to the HDTV 220 via the wireless transceiver 406.

The HDTV 220 receives the transmitted digital signature through the wireless receiver 323, in step 508. The decoder 322 of the HDTV 220 decodes the received digital signature and presents the digital signature for the controller 324. The controller 324 of the HDTV may be further configured to transmit the digital signature to the website via the modem or other connections to complete the transaction, in step 510. Accordingly, a user may use a remote control of an HDTV to complete on-line transactions requiring digital signatures without using a personal computer, thereby providing the capability of mobility.

Figure 6:
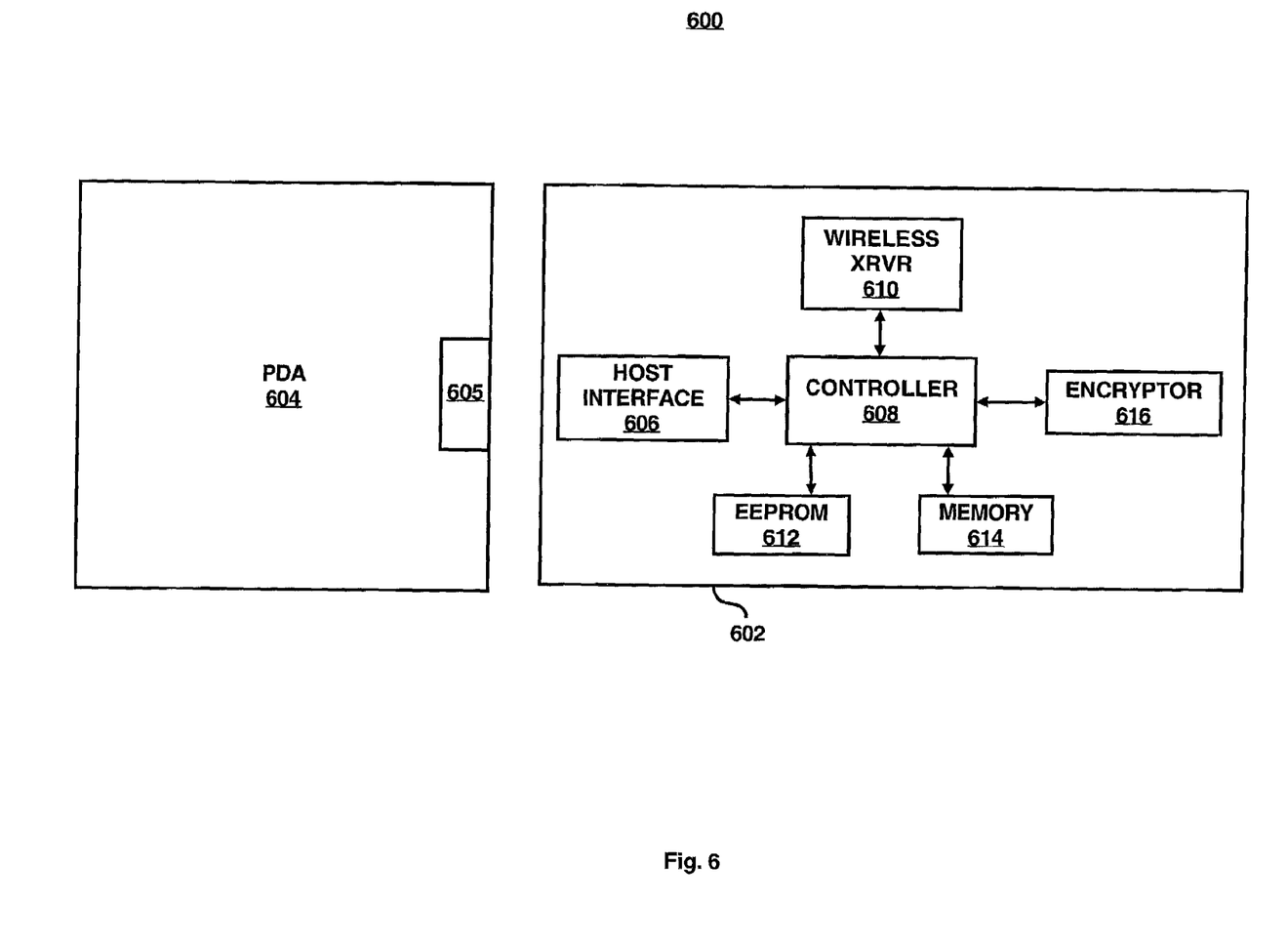
FIG. 6 illustrates another embodiment of a remote signature system in accordance with the principles of the present invention.

FIG. 6 illustrates another embodiment of a remote signature system 600 in accordance with the principles of the present invention. In particular, a remote signature module 602 may be a supplemental device that is configured to interface with host electronic device such as a personal digital assistant ("PDA") 604 to provide the capability of transmitting a digital signature of user to complete secure on-line transactions through a host interface 605. Alternatively, the remote signature module 602 may be interfaced with other portable electronic devices such as cellular telephones, pagers, and other portable host electronic devices.

In accordance with the principles of the present invention, the remote signature module 602 may include a host interface 606, a controller 608, a wireless transceiver 610, an EEPROM 612, a memory 614, and an encryptor module 616. The host interface 606 of the remote signature module 602 may be configured to provide a communication medium between the host electronic device, e.g., PDA 604, and the remote signature module 602. The host interface 606 may include a connector designed for a specific host electronic device. Alternatively, dependent on the host electronic device, the host interface 606 may be configured to conform to industry standard interfaces such as PCI, Bluetooth, or the like.

The host interface 606 may be further configured to interface with the controller 608. The controller 608 may be configured to implement the functionality of the remote signature module 602. The controller 608 may be a microprocessor, a micro-controller, a digital signal processor, an ASIC or the like.

The controller 608 may be further configured to interface with the wireless transceiver 610. The wireless transceiver 610 may be configured to wirelessly transmit and receive data, command, or the like between the remote signature system 600 and complementary equipped electronic devices including an Internet terminal. The wireless transceiver may operate on radio frequency, infrared or the similar protocols. Alternatively, the remote signature module 602 may bypass the wireless transceiver 610 by transmitting a digital signature of a user through the host interface 606 to the host device, e.g., PDA, if the host device is equipped with wireless capability. Thereby, the host device 604 may transmit the digital signature to an Internet terminal.

The controller 608 may be further configured to interface with the EEPROM 612. The EEPROM 612 may be configured to provide non-erasable storage of an operating system, program, and/or data to be utilized by the controller 608 for the operation of the remote signature module 602. Although the current embodiment utilizes an EEPROM for non-erasable memory, other devices such as flash memories, disk storage or the like may be utilized to provide non-erasable storage.

The memory 614 may interface with the controller 608. The memory 614 may be configured to provide storage of a digital signature that may be downloaded into the remote signature module 602. The memory 614 may be implemented with a memory device such as a COMPACTFLASH memory, a flash memory, etc.

Alternatively or together, the remote signature module 602 may utilize the encryptor module 616 to generate a digital signature of a user. The encryptor module 616 may be configured to generate the digital signature from a key value stored in the memory 614. Accordingly, a user of the remote signature system 600 may transmit a digital signature to complete an Internet transaction while the user is mobile.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method for conducting an electronic transaction, said method comprising:

storing a digital signature of a user in a memory of a remote control controlling at least one function of a television set wherein said at least one function includes at least one of volume control, channel selection and color selection;

performing said electronic transaction; and transmitting said digital signature of said user from said remote control to complete said electronic transaction, wherein the digital signature remains stored in the memory after the transaction is completed or canceled.

2. The method for conducting an electronic transaction according to claim 1, further comprising:

presenting said electronic transaction on an Internet terminal, wherein said Internet terminal includes said television set;

receiving said digital signature by said Internet terminal; and presenting a verification of conclusion of said electronic transaction.

3. The method for conducting an electronic transaction according to claim 2, wherein said digital signature of said user is transmitted utilizing wireless protocols.

4. A device for transmitting a digital signature, said device comprising:

a memory;

a keypad configured to provide a user interface;

a wireless transceiver; and a controller configured to transmit a digital signature stored in said memory through said wireless transceiver to complete an electronic transaction in response to a first input from said keypad, wherein the digital signature remains stored in the memory after the transaction is completed or canceled; and said controller is further configured to transmit a signal to a television set for controlling at least one of volume control, channel selection and color selection of said television set.

5. The device for transmitting a digital signature according to claim 4, wherein said controller is further configured to receive said digital signature from a second device adapted to generate said digital signature in response to a second input from said keypad.

6. The device for transmitting a digital signature according to claim 4, further comprising an encryptor module for encrypting the digital signature.

7. An apparatus comprising:

memory means for storing a digital signature of a user in one of a remote control controlling at least one function of a television set and a personal digital assistant;

means for initiating an electronic transaction using the memory means and an Internet terminal connected to at least one of the remote control and the personal digital assistant; and means for transmitting said digital signature of said user from said memory means to the Internet terminal for completing said electronic transaction, wherein the digital signature remains stored in the memory means after the transaction is completed or canceled.

8. The apparatus according to claim 7, further comprising means for encrypting the digital signature.

9. The apparatus according to claim 7, further comprising means for receiving the digital signature from a second device.

* * * * *